(12) United States Patent
Alstad

(10) Patent No.: US 10,783,869 B2
(45) Date of Patent: Sep. 22, 2020

(54) CELL STRUCTURE FOR USE IN AN ACOUSTIC PANEL, AND METHODS OF PRODUCING THE SAME

(71) Applicant: HONEYWELL INTERNATIONAL INC., Morris Plains, NJ (US)

(72) Inventor: Shawn Alstad, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 466 days.

(21) Appl. No.: 15/702,414

(22) Filed: Sep. 12, 2017

(65) Prior Publication Data

US 2019/0080679 A1    Mar. 14, 2019

(51) Int. Cl.

| | | |
|---|---|---|
| *G10K 11/172* | (2006.01) | |
| *G10K 11/16* | (2006.01) | |
| *E04B 1/99* | (2006.01) | |
| *F02C 7/045* | (2006.01) | |
| *B32B 3/12* | (2006.01) | |
| *B33Y 80/00* | (2015.01) | |
| *B32B 15/01* | (2006.01) | |
| *B22F 3/105* | (2006.01) | |

(52) U.S. Cl.
CPC ............. *G10K 11/172* (2013.01); *B32B 3/12* (2013.01); *B32B 15/01* (2013.01); *B33Y 80/00* (2014.12); *G10K 11/16* (2013.01); *B22F 3/1055* (2013.01); *B32B 2307/102* (2013.01); *E04B 1/99* (2013.01); *F02C 7/045* (2013.01)

(58) Field of Classification Search
CPC ..... B32B 3/12; B32B 2307/102; F02C 7/045; G10K 11/172; G10K 11/16; E04B 1/99

USPC .......................................... 181/288, 292, 293
See application file for complete search history.

(56) References Cited

U.S. PATENT DOCUMENTS

| | | | |
|---|---|---|---|
| 3,831,710 A | 8/1974 | Wirt | |
| 4,667,768 A | 5/1987 | Wirt | |
| 5,760,349 A | 6/1998 | Borchers et al. | |
| 6,536,556 B2 * | 3/2003 | Porte | B32B 3/12 |
| | | | 181/284 |
| 9,068,345 B2 * | 6/2015 | Ichihashi | E04B 1/84 |
| 9,303,588 B2 * | 4/2016 | Pongratz | G10K 11/172 |
| 9,334,059 B1 | 5/2016 | Jones et al. | |
| 10,032,445 B1 * | 7/2018 | Linch | B32B 3/12 |
| 10,280,839 B2 * | 5/2019 | Riou | B32B 7/12 |
| 10,294,815 B2 * | 5/2019 | Runyan | F01D 25/00 |
| 10,363,726 B2 * | 7/2019 | Butler | B29D 99/0021 |

(Continued)

FOREIGN PATENT DOCUMENTS

| | | |
|---|---|---|
| EP | 2605238 A2 | 6/2013 |
| WO | 2015023389 A1 | 2/2015 |
| WO | 2016046494 A1 | 3/2016 |

OTHER PUBLICATIONS

Extended EP Search Report for Application No. 18191866.5-1003/3454329 dated Feb. 13, 2019.

*Primary Examiner* — Jeremy A Luks

(74) *Attorney, Agent, or Firm* — Lorenz & Kopf, LLP

(57) ABSTRACT

An improved cell structure that enables design improvements to acoustic panels is provided. The provided cell structure for an acoustic panel is (i) capable of damping a wider range of audible frequencies, (ii) able to be easily combined and integrated into a variety of panel dimensions, and (iii) manufacturable using additive manufacturing techniques such as direct metal laser sintering (DMLS).

11 Claims, 4 Drawing Sheets

(56) References Cited

U.S. PATENT DOCUMENTS

| | | | |
|---|---|---|---|
| 2005/0263346 A1* | 12/2005 | Nishimura | E04B 1/86 181/290 |
| 2006/0169531 A1* | 8/2006 | Volker | G10K 11/172 181/204 |
| 2012/0247867 A1* | 10/2012 | Yang | E04B 1/86 181/211 |
| 2016/0237836 A1 | 8/2016 | Harris | |
| 2016/0356036 A1 | 12/2016 | Ryan et al. | |

* cited by examiner

CELL STRUCTURE FOR USE IN AN ACOUSTIC PANEL, AND METHODS OF PRODUCING THE SAME

TECHNICAL FIELD

The present disclosure generally relates to acoustic panels and methods of producing the same, and more particularly relates to a cell structure for use in various acoustic panel applications, and methods of producing the same.

BACKGROUND

In a variety of applications, such as aircraft, aircraft engines, automotive, mining, farming, audio equipment, heating ventilation and air conditioning (HVAC), and the like, pressure waves are generated in a broad range of audible frequencies. The audible frequencies are sound waves experienced as noise. Acoustic treatments employ acoustic panels to dampen the sound waves.

The performance of a given acoustic panel is generally increased by increasing its surface area. However, technological challenges in manufacturing and material forming techniques often limit the amount of surface area available. This often drives acoustic panel designs that employ only a single degree of freedom (damping sound waves at a single frequency) or a double degree of freedom (damping sound waves at two frequencies).

Accordingly, design improvements to acoustic panels are desirable. It is further desirable to address these technological challenges at a fundamental building block level. It is desirable, therefore, to provide an improved cell structure for an acoustic panel (i) capable of damping a wider range of audible frequencies, (ii) able to be easily combined and integrated into a variety of panel dimensions, and (iii) manufacturable using additive manufacturing techniques. Furthermore, other desirable features and characteristics of the present embodiment will become apparent from the subsequent detailed description and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a cell structure for use in an acoustic panel, the cell structure comprising: a cavity enclosed by a continuous boundary wall, the boundary wall (i) having a central axis, (ii) having a regular shaped cross section perpendicular to the central axis, (iii) having a floor side and an entrance side, (iv) the entrance side separated from the floor side by a first height; a support structure arranged in the cavity; and a chamber suspended within the cavity by the support structure, the chamber being coaxial with the boundary wall and axisymmetric around the central axis, the chamber being closed on the entrance side and open on the floor side.

Also provided is an additively manufactured acoustic panel, the acoustic panel comprising: a plurality of integrally joined cell structures, each cell structure of the plurality of cell structures having the same entrance side and the same floor side, each cell structure of the plurality of cell structures comprising: (a) a cavity enclosed by a continuous boundary wall, the boundary wall (i) having a central axis, (ii) having a regular shaped cross section perpendicular to the central axis, (iii) having a floor side and an entrance side, (iv) the entrance side separated from the floor side by a first height; (b) a support structure arranged in the cavity; and (c) a chamber suspended within the cavity by the support structure, the chamber being coaxial with the boundary wall and axisymmetric around the central axis, the chamber being closed on the entrance side and open on the floor side.

In addition, a method for manufacturing a cell structure for an acoustic panel is provided. The method comprises: creating a cavity with a central axis, a regular shaped cross section perpendicular to the central axis, a floor side, and an entrance side, with a continuous boundary wall; arranging a support structure in the cavity; and using the support structure to suspend a chamber within the cavity, the chamber being coaxial with the boundary wall and axisymmetric around the central axis, the chamber being closed on the entrance side and open on the floor side; wherein a maximum cross sectional area of the floor side of the chamber is approximately 50% of a maximum cross sectional area of the cell structure, and a maximum cross sectional area of the entrance side of the chamber is approximately 10% of the maximum cross sectional area of the cell structure.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein.

DETAILED DESCRIPTION

Figure 1:
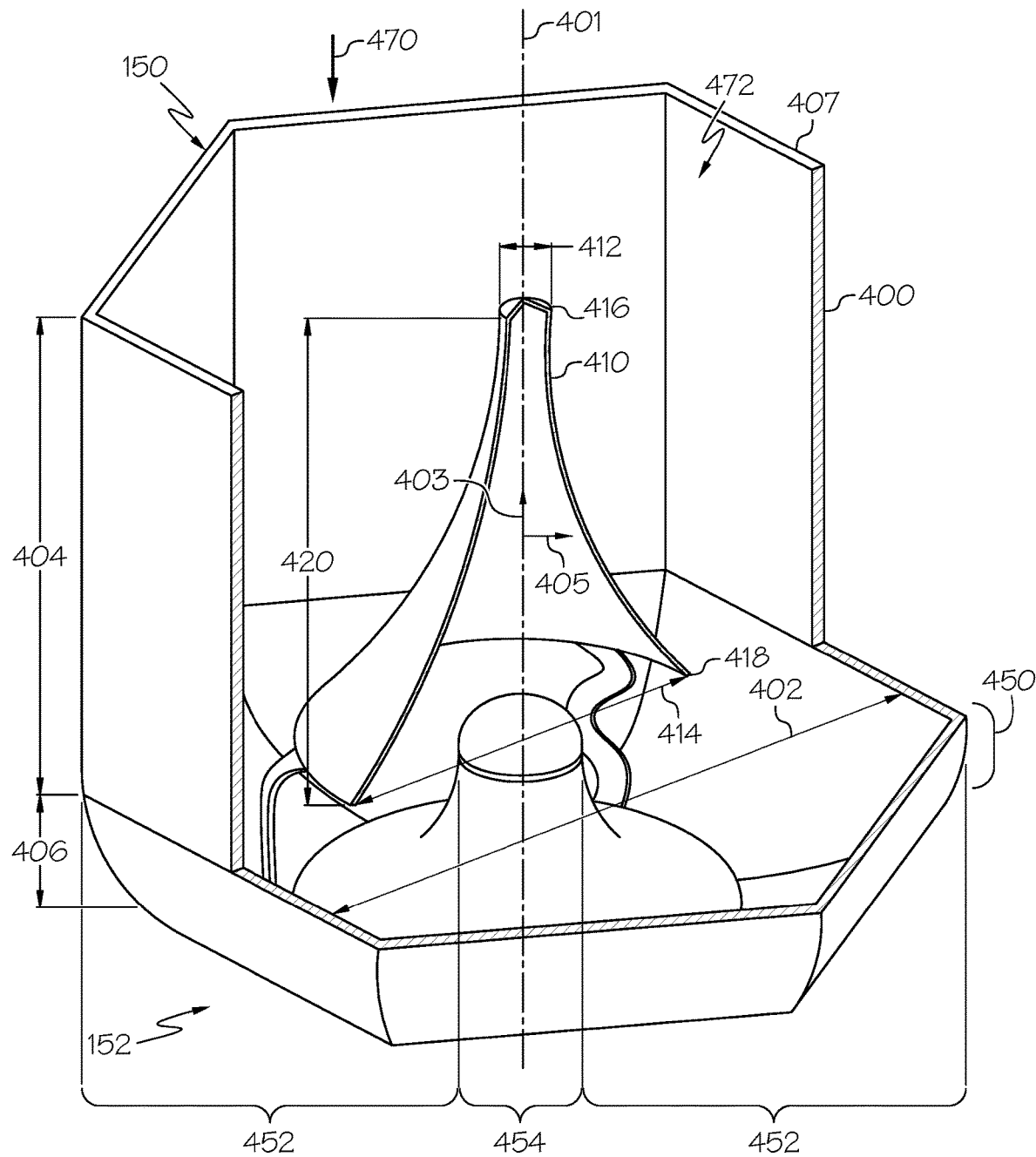
FIG. 1 is a diagram depicting a cross section of a single cell structure, showing a chamber suspended within the cell cavity, in accordance with an embodiment.

The following detailed description is merely exemplary in nature and is not intended to limit the various embodiments or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

A novel cell structure for use in acoustic panels is introduced herein. The provided cell structure has a geometry that may be easily replicated into an array of a plurality of interconnected cell structures. The provided cell structure is designed to have a suspended hollow chamber, such as an inverted cone. Sound pressure, in the form of sound waves, enter the cell structure and are deflected down the exterior of the chamber, off of a cell structure floor, and then into the interior of the chamber. In response to the sound waves in the interior of the chamber, the chamber vibrates up and down, converting the sound waves into mechanical heat in the cell structure. The conversion of the sound waves into mechanical heat decreases the sound pressure within the cell structure, and dampens the sound wave. This results in a lowered noise level. Arrays of the provided cell structure may be used to create acoustic panels for acoustic treatment in applications, such as aircraft, aircraft engines, automotive, mining, farming, audio equipment, heating ventilation and air conditioning (HVAC), and the like. The cell structure, and arrays thereof, may be produced using an additive manufacturing technology.

Additive manufacturing is referenced herein. Additive manufacturing, sometimes referred to as 3D printing, is a process in which an object is formed via successive layering using feed material, and this layering process advantageously averts many complex tooling steps in many instances. A given additive manufacturing process may be automated or computer-controlled such that a desired object or article is fabricated on a layer-by-layer basis in accordance with computer-readable design data, such as Computer Aided Design (CAD) files, defining the shape and dimensions of the object. In some additive manufacturing processes, such as direct metal laser sintering (DMLS), the feed material used for metallic parts of an object may be a powdered metal. In the powdered feed material process, powdered metal can be applied to a base and melted in desired locations. The powdered feed material may be melted with a laser beam. The melted powder is solidified to form a layer of the desired product. More metal powder is provided and melted in desired locations to form the next layer, and the process proceeds. In other additive manufacturing processes, the source material may be supplied as a powder or in a different form (e.g., as a wire feed, the source material may be metallic or non-metallic, and other types of targeted energy (e.g., laser or electron beams) may be utilized to successively deposit the source material in desired locations on a base or on previous layers to gradually build up a desired shape.

Figure 2:
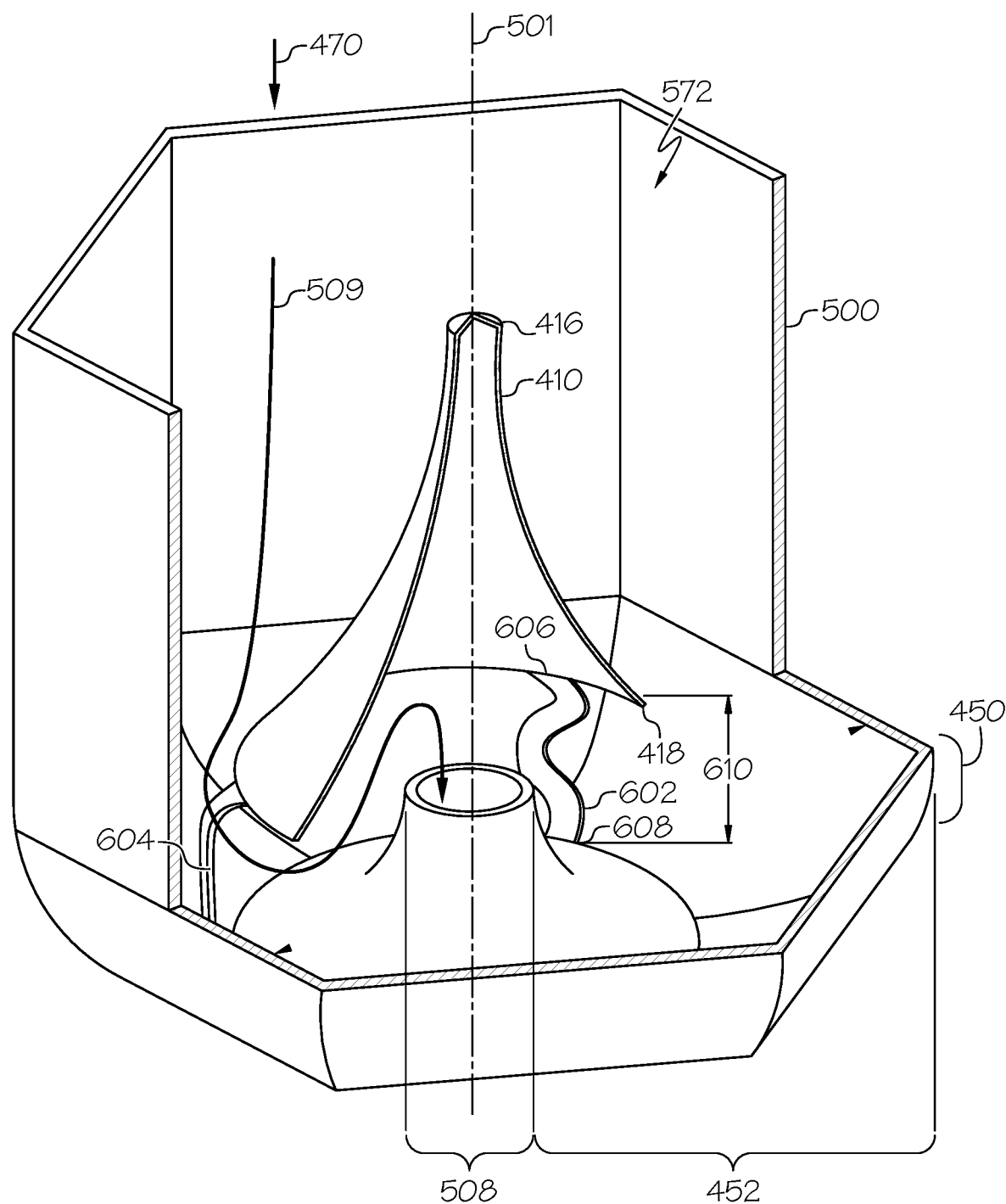
FIG. 2 is a diagram depicting a cross section of a single cell structure, showing a chamber suspended within the cell cavity, in accordance with another embodiment.

Turning now to FIGS. 1 and 2, a chamber 410 suspended within a cell structure cavity (472, 572), in accordance with various embodiments, is described. FIGS. 1-2 are cross sectional views cut through a cell structure central axis, and dividing a respective cell structure cross sectional area into two symmetrical halves. FIGS. 1-2 depict embodiments having different cell structure floors. In FIG. 1, cell structure 400 is defined by an inner diameter 402 measured across a central axis 401. Continuous boundary wall 407 has height 404, and encloses or creates a cell structure cavity 472 (hereinafter "cavity") therein. Although the depicted continuous boundary wall 407 is solid, in some embodiments, the boundary wall 407 is perforated with a plurality of through-holes. Cavity 472 has an entrance side 150 and a floor side 152.

On the floor side 152, cell structure floor 450 has been modified to form a deflector shield 452 that is uniformly concave (with respect to the inside of the cell structure 400, or the cavity 472). The deflector shield 452 is centered on the central axis 401, and has a depth 406. Deflector shield 452 may exclude a central area (i.e., also centered on the central axis 401) of diameter 454; as may be appreciated, diameter 454 is smaller than diameter 402. The central area may have any of a variety of shapes. In the embodiment of FIG. 1, the central area is a convex dome.

Chamber 410 is an inverted cavity that is suspended within the cavity 472 (and cavity 572) of cell structure 400 (and cell structure 500), and smaller in size than a respective cavity 472. A Z axis (403) and an X axis (405) are shown for reference. Chamber 410 is coaxial with the boundary wall 407, axisymmetric around the central axis 401, and has a chamber height 420. The chamber 410 is closed on the entrance side 416 and open on the floor side 418. Chamber 410 has a chamber minimum diameter 412 on the entrance side 416, and chamber maximum diameter 414 on the floor side 418. When sound waves 470 enter into cell structure 400, the deflector shield 452 may reflect the sound waves 470 into the interior of the chamber 410. In an embodiment, the floor side 418 of the chamber 410 has a maximum cross sectional area that is approximately 50% of the maximum cross sectional area of the cell structure 400. Although the chamber 410 is depicted as cone shaped, and about 30% wider on the floor side than on the entrance side, the chamber 410 may take on other shapes in other embodiments.

In FIG. 2, cell structure 500 is shown having cavity 572 surrounding central axis 501. Dimensions of the boundary wall, cell structure radius, deflector shield 452, and the chamber 410 are the same as described in connection with FIG. 1. Again, cell structure floor 450 has been modified to be uniformly concave (with respect to the inside of the cell structure 500, or the cavity 572) in a deflector shield 452 area. Deflector shield 452 has a depth 406, and a central area defined by diameter 508 that is substantially the same as the diameter 454 described in connection with FIG. 1. In FIG. 2, the central area defined by diameter 508 is an opening in the cell structure floor 152 to the exterior of the cell structure 500 on the floor side 152. Similar to FIG. 1, when sound waves 509 enter into cell structure 500, the deflector shield 452 may direct sound waves 509 into the interior of the chamber 410; however, in contrast to FIG. 1, sound waves 509 may then deflect off of the interior walls of the chamber 410 and exit the cell structure floor 450 through the opening. In various embodiments, the opening of diameter 508 comprises approximately 30% of a cross sectional area of the cell structure floor 450.

As described, the chamber 410 is suspended inside a respective cell structure cavity. Suspension is provided by an application specific support structure arranged within the cavity (472, 572). The components, shape, and orientation comprising the support structure may be based on the frequencies of the sound waves intended for damping. In various embodiments, the support structure can comprise one or more beams, springs, or stabilizing rings, and may attach at the boundary wall 407 and/or cell structure floor 450. In an embodiment, the support structure comprises at least one tunable spring beam 602, wherein the dimensions of the tunable spring beam 602, its curvature, and the material from which it is made, are tunable to (i.e., based on) the anticipated sound waves associated with the target application. With reference to FIG. 1 and FIG. 2, tunable spring beams 602 and 604 are shown. The tunable spring beam 602 is attached on a first end 606 to the chamber 410 and on a second end 608 to the deflector shield 452. The tunable spring beam 602 has a length 610; the material, location, curvature, and dimensions of the at least one tunable spring beam 602 is configured to position the exit side 418 of the chamber 410 over a respective central area (with diameter 454 or 508) in a manner that addresses the anticipated acoustic exposure from the target application. In various embodiments, a third tunable spring beam would be present in the cutaway section, and the three tunable spring beams would each be separated radially (from the central axis 401 or central axis 501) from each other by 120 degrees around the perimeter of the exit side 418 of the chamber. Accordingly, in the depicted embodiment, the support structure comprises one or more of the tunable spring beams (602, 604, and the third spring beam).

The support structure of a given cell structure is tunable to a predetermined, application-specific cell frequency that it is desirable to dampen. With respect to support structures that employ tunable spring beams, such as is shown in FIGS. 1 and 2, all of the utilized tunable spring beams making up the support structure of a given cell structure may be tuned to substantially the same cell frequency. Further, in some embodiments of an acoustic panel comprising a plurality of cell structures, the cell frequency of each cell of the plurality of cell structures is substantially the same. However, in some applications, it is desirable to dampen multiple, predetermined, specific, frequencies; in embodiments addressing this need, an acoustic panel comprising a plurality of cell structures may be created in which each cell structure of the plurality of cell structures has a support structure (i.e., its tunable spring beams) that is tuned to a cell frequency that is a different one of the multiple, predetermined, specific, frequencies. As may be understood, an acoustic panel made from a plurality of integrated cell structures, each tuned to a different cell frequency, enables each respective chamber to resonate at the designated cell frequency, to collectively absorb sound across a broad range of frequencies.

Figure 3:
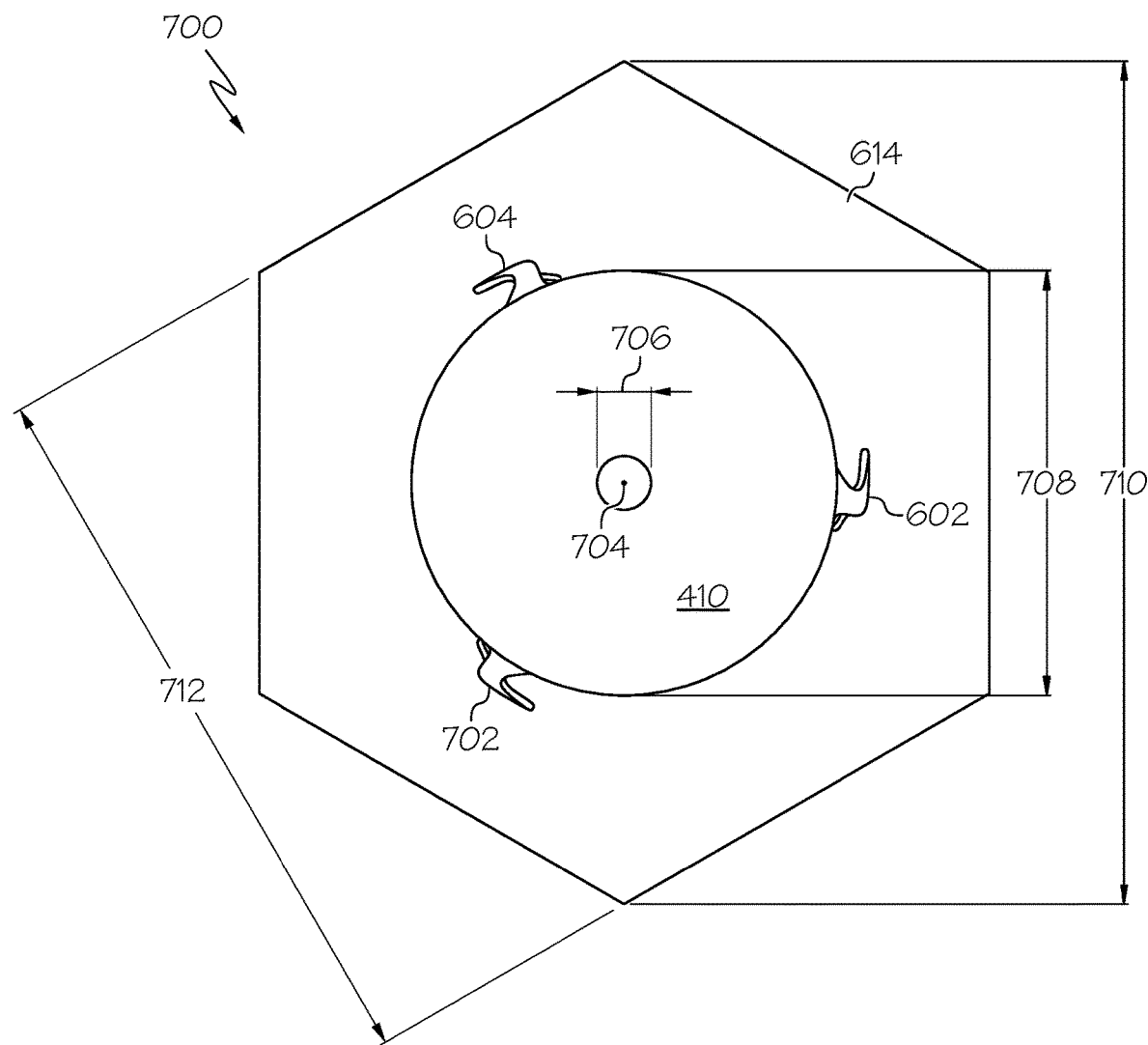
FIG. 3 is a top down view of a single cell structure, in accordance with various embodiments.

The top down view 700 in FIG. 3 shows the hexagonal shape of the cell structure 400 and/or 500 in various embodiments. Viewing the cell structure from the entrance side 150, the chamber 410 has entrance side diameter 706, measured with respect to the central axis 704, and the exit side of the chamber 410 has diameter 708. The floor of the hexagonal cell structure has outer diameter 710 (largest width), and inner diameter 712 (smallest width). In an embodiment, a maximum cross sectional area of the floor side of the chamber 410 is approximately 50% of a cross sectional area of the floor of the cell structure 700. In addition, in some embodiments, a maximum cross sectional area of the entrance side 416 of the chamber 410 is approximately 10% of the maximum cross sectional area of the floor side 418 of the chamber 410. In other words, a maximum circular area with diameter 706 is approximately 10% of a maximum circular area with diameter 708.

Figure 4:
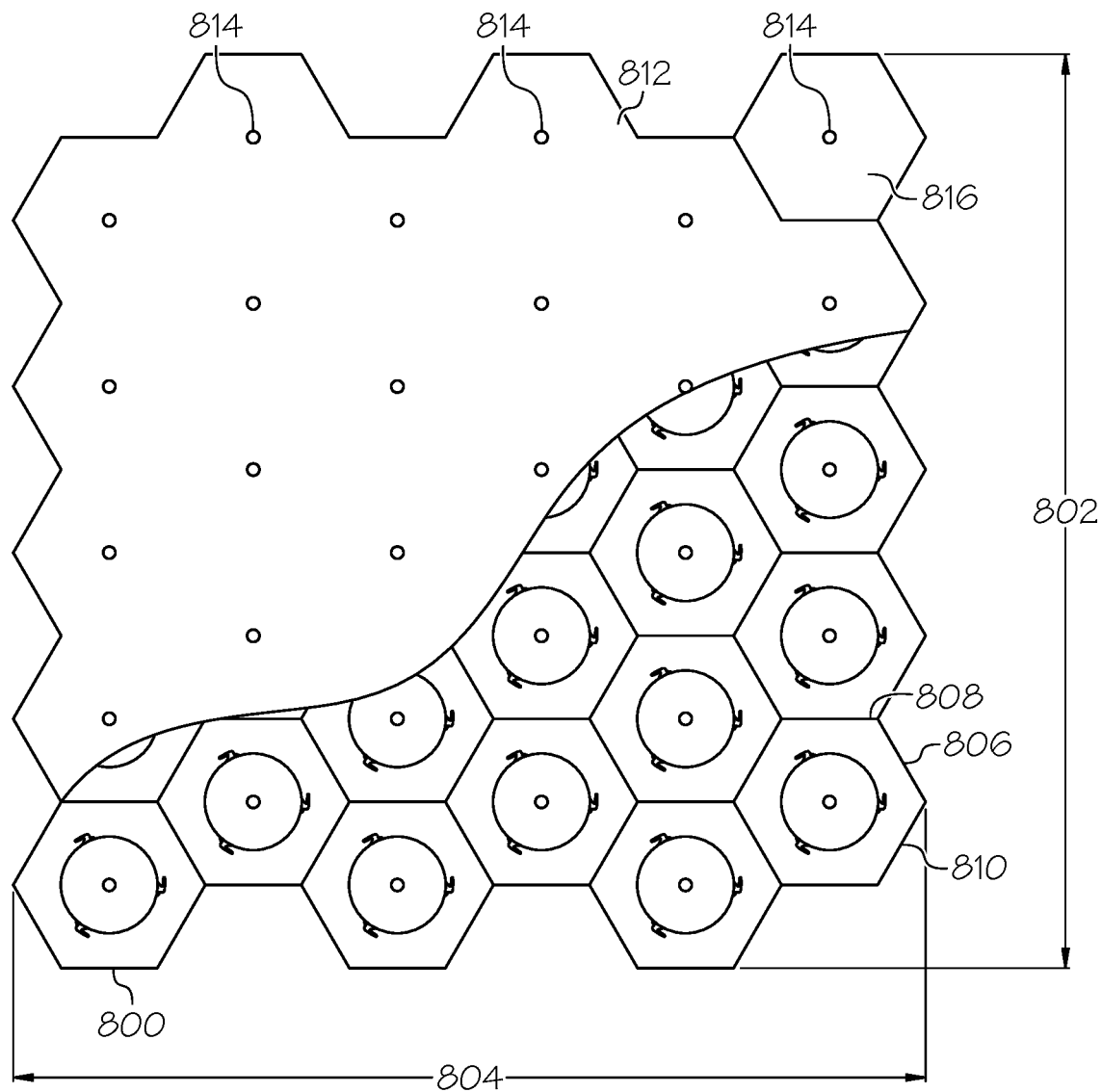
FIG. 4 is a top down view of an array of single cell structures, in accordance with various embodiments.

Turning now to FIG. 4, an array 800 of cell structures is shown. Array 800 is organized such that a first dimension 802 has a plurality of rows of cell structures, and a second dimension 804 has a plurality of columns of cell structures. Single cell structure 806, on the edge of array 800, is indicated for reference. Cell structure 806 has shared boundary walls, such as shared wall 808, and unshared boundary walls, such as unshared wall 810. As may be seen in FIG. 4, the hexagonal shape of the cell structures maximizes a percentage of shared boundary walls (for example, shared wall 808). In cell structures that are internal to the array 800, all boundary walls may be shared walls. As is readily appreciated, embodiments in which the cell structures have different shapes may result in variations in array organization and percentages of shared walls to unshared walls.

Face sheet 812 is shown configured to cover the entrance side of each of the cavities. Further, face sheet 812 is configured to have a single through-hole 814 that is positioned to be substantially coaxial with the center axis of each respective cavity. Face sheet 812 may be separately manufactured and attached or brazed to a manufactured array 800 in a separate step. In other embodiments, face sheet 812 is not a separate piece, but is instead an integration of a plurality of individual cell structure ceilings 816, each cell structure ceiling 816 manufactured in the additive manufacturing process, at the same time as the formation of the above described cell structure components. In an embodiment, the through-holes 814 may be 10 to 15 thousandths of an inch in diameter.

The n tunable spring beams (602 and 604) and the chamber 410 may comprise different materials, as is suitable to an application. As may be appreciated, generation of cell structure 400 and cell structure 500 can present a machining difficulty, which makes additive manufacturing a desirable approach. With reference to FIGS. 1-3, when produced via an additive manufacturing process, the support structure, such as the n tunable spring beams (602 and 604) are mechanically connected, or integrally joined, with the chamber 410 and the deflector shield 452. As may also be appreciated, boundaries between a chamber 410, an associated support structure components (such as the tunable spring beams 602 and 604), a respective deflector shield 452, and a respective cell structure ceiling 816, when produced via additive manufacturing, may not be distinctive. Although a flat panel array is depicted in FIG. 4, the provided cell structure embodiments may be easily combined and integrated into a variety of panel dimensions and shapes.

Thus, a novel cell structure (400, 500, and 806) for use in acoustic panels is provided. The provided cell structure has a geometry that may be easily replicated into an array of a plurality of interconnected cell structures. Arrays of the provided cell structure may be used to create acoustic panels for acoustic treatment in applications, such as aircraft, aircraft engines, automotive, mining, farming, audio equipment, heating ventilation and air conditioning (HVAC), and the like. The cell structure, and arrays thereof, may be produced using an additive manufacturing technology. As is readily appreciated, the above examples are non-limiting, and many other embodiments may meet the functionality described herein while not exceeding the scope of the disclosure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one embodiment has been presented in the foregoing detailed description of the invention, it should be appreciated that a vast number of variations exist. It should also be appreciated that the embodiment or embodiments are only examples, and are not intended to limit the scope, applicability, or configuration of the invention in any way. Rather, the foregoing detailed description will provide those skilled in the art with a convenient road map for implementing an embodiment of the invention, it being understood that various changes may be made in the function and arrangement of elements described without departing from the scope as set forth in the appended claims and their legal equivalents.

What is claimed is:

1. A cell structure for use in an acoustic panel, the cell structure comprising:
    a cavity enclosed by a continuous boundary wall, the boundary wall (i) having a central axis, (ii) having a regular shaped cross section perpendicular to the central axis, (iii) having a floor side and an entrance side, (iv) the entrance side separated from the floor side by a first height;
    a support structure arranged in the cavity;
    a chamber suspended within the cavity by the support structure, the chamber being coaxial with the boundary wall and axisymmetric around the central axis, the chamber being closed on the entrance side and open on the floor side wherein a maximum cross sectional area of the floor side of the chamber is approximately 50% of a maximum cross sectional area of the cell structure; wherein a maximum cross sectional area of the entrance side of the chamber is approximately 10% of the maximum cross sectional area of the cell structure; wherein the boundary wall, support structure, and the chamber, are fabricated using an additive manufacturing process; and wherein the support structure comprises a tunable spring beam attached on a first end to the chamber and attached on a second end to the floor side.

2. The cell structure of claim 1, wherein the tunable spring beam is one of three tunable spring beams, each attached on a first end to the chamber and attached on a second end to the floor side, the three tunable spring beams separated radially around the central axis by approximately 120 degrees.

3. The cell structure of claim 1, wherein an opening in the floor side comprises approximately 30% of the cross sectional area of the floor side.

4. The cell structure of claim 1, wherein the boundary wall is perforated.

5. The cell structure of claim 1, further comprising a cell structure ceiling with a through hole.

6. An additively manufactured acoustic panel, the acoustic panel comprising:
    a plurality of integrally joined cell structures, each cell structure of the plurality of cell structures having the same entrance side and the same floor side, each cell structure of the plurality of cell structures comprising
        (a) a cavity enclosed by a continuous boundary wall, the boundary wall (i) having a central axis, (ii) having a regular shaped cross section perpendicular to the central axis, (iii) having a floor side and an entrance side, (iv) the entrance side separated from the floor side by a first height;
        (b) a support structure arranged in the cavity;
        (c) a chamber suspended within the cavity by the support structure, the chamber being coaxial with the boundary wall and axisymmetric around the central axis, the chamber being closed on the entrance side and open on the floor side; wherein a maximum cross sectional area of the floor side of each chamber is approximately 50% of a maximum cross sectional area of the respective cell structure; wherein a maximum cross sectional area of the entrance side of each chamber is approximately 10% of the maximum cross sectional area of the respective cell structure; and wherein, for each cell structure, each support structure comprises a tunable spring beam attached on a first end to the respective chamber and attached on a second end to the respective floor side.

7. The acoustic panel of claim 6, wherein, for each cell structure, the tunable spring beam is one of three tunable spring beams, each attached on a first end to the chamber and attached on a second end to the floor side, the three tunable spring beams separated radially around the central axis by approximately 120 degrees.

8. The acoustic panel of claim 6, wherein, for each cell structure, an opening in the floor side comprises approximately 30% of the cross sectional area of the respective floor side.

9. The acoustic panel of claim 7, wherein, for each cell structure, an opening in the floor side comprises approximately 30% of the cross sectional area of the respective floor side.

10. A method for manufacturing a cell structure for an acoustic panel, the method comprising:
    creating a cavity with a central axis, a regular shaped cross section perpendicular to the central axis, a floor side, and an entrance side, with a continuous boundary wall;
    arranging a support structure in the cavity;
    using the support structure to suspend a chamber within the cavity, the chamber being coaxial with the boundary wall and axisymmetric around the central axis, the chamber being closed on the entrance side and open on the floor side;
    wherein a maximum cross sectional area of the floor side of the chamber is approximately 50% of a maximum cross sectional area of the cell structure, and a maximum cross sectional area of the entrance side of the chamber is approximately 10% of the maximum cross sectional area of the cell structure; and wherein the support structure comprises a tunable spring beam attached on a first end to the chamber and attached on a second end to the floor side.

11. The method of claim 10, further comprising, covering the entrance side of the cavity with a cell structure ceiling having a through-hole therein.

* * * * *